United States Patent
Deng et al.

(10) Patent No.: US 11,296,969 B2
(45) Date of Patent: Apr. 5, 2022

(54) METHODS AND DEVICES FOR ENERGY SAVING IN COMMUNICATION NETWORK

(71) Applicant: Telefonaktiebolaget LM Ericsson (publ), Stockholm (SE)

(72) Inventors: Jun Deng, Beijing (CN); Shujie Yang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/966,803

(22) PCT Filed: Jan. 31, 2018

(86) PCT No.: PCT/CN2018/074667
§ 371 (c)(1),
(2) Date: Jul. 31, 2020

(87) PCT Pub. No.: WO2019/148342
PCT Pub. Date: Aug. 8, 2019

(65) Prior Publication Data
US 2021/0044510 A1    Feb. 11, 2021

(51) Int. Cl.
*G06F 15/173*   (2006.01)
*H04L 43/16*   (2022.01)
*H04L 41/0833*   (2022.01)
*H04L 41/0893*   (2022.01)
*H04L 43/0894*   (2022.01)

(52) U.S. Cl.
CPC .......... *H04L 43/16* (2013.01); *H04L 41/0833* (2013.01); *H04L 41/0893* (2013.01); *H04L 43/0894* (2013.01)

(58) Field of Classification Search
CPC . H04L 43/16; H04L 41/0833; H04L 41/0893; H04L 43/0894
See application file for complete search history.

(56) References Cited

U.S. PATENT DOCUMENTS

2015/0055664 A1    2/2015   Kanonakis et al.

FOREIGN PATENT DOCUMENTS

CN   106803811 A   6/2017

OTHER PUBLICATIONS

International Search Report and the Written Opinion of the International Searching Authority, issued in corresponding International Application No. PCT/CN2018/074667, dated Oct. 18, 2018, 10 pages.
OIF, Optical Internetworking Forum, "Flex Ethernet Implementation Agreement" IA#OIF-FLEXE-01.0, Mar. 2016, 31 pages.

*Primary Examiner* — Wing F Chan
*Assistant Examiner* — Joseph R Maniwang
(74) *Attorney, Agent, or Firm* — Rothwell, Figg, Ernst & Manbeck, P.C.

(57) ABSTRACT

A method for energy saving in a communication network is provided. The method is implemented by a first network device in a communication network. The first network device may be communicatively connected to a second network device by a FlexE group. The method may comprise measuring a traffic rate of one or more FlexE clients carried over the FlexE group, and determining whether one or more PHYs of the FlexE group is to be shut down or activated based on the measured traffic rate and a first shutdown threshold or a first activation threshold.

24 Claims, 7 Drawing Sheets measuring a traffic rate of one or more FlexE clients carried over the FlexE group — 201 determining whether one or more PHYs of the FlexE group is to be shut down or activated based on the measured traffic rate and a first shutdown threshold or a first activation threshold — 202

METHODS AND DEVICES FOR ENERGY SAVING IN COMMUNICATION NETWORK

CROSS REFERENCE TO RELATED APPLICATION(S)

This application is a 35 U.S.C. § 371 National Phase Entry Application from PCT/CN2018/074667, filed Jan. 31, 2018, designating the United States, the disclosure of which is incorporated herein by reference in its entirety.

TECHNICAL FIELD

The present disclosure generally relates to Flexible Ethernet (FlexE), and more specifically to methods and devices for energy saving in communication network under FlexE.

BACKGROUND

The FlexE defined by Optical Interworking Forum (OIF) provides a generic mechanism for supporting a variety of Ethernet Media Access Control (MAC) rates that may or may not correspond to any existing Ethernet Physical (PHY) rate. This includes MAC rates that are both greater than (through bonding) and less than (through sub-rate and channelization) the Ethernet PHY rates used to carry FlexE.

Conventionally, the general capabilities supported by FlexE mechanism include (i) bonding of Ethernet PHYs, e.g., supporting a 200G MAC over two bonded 100GBASE-R PHYs, (ii) sub-rates of Ethernet PHYs, e.g., supporting a 50G MAC over a 100GBASE-R PHY, and (iii) channelization within a PHY or a group of bonded PHYs, e.g., support a 150G and two 25G MACs over two bonded 100GBASE-R PHYs. Note, combinations are also contemplated, for example, a sub-rate of a group of bonded PHYs, for example, a 250G MAC over three bonded 100GBASE-R PHYs. A FlexE group refers to a group including 1 to n bonded Ethernet PHYs. A FlexE group is composed of e.g. 1~254 100G PHYs.

A typical deployment of FlexE group is composed of 2~8 PHYs with clients' traffic distributed among the PHYs. Each 100G PHY consumes ~5 watts and 200G/400G PHY consumes more. However, in a transport network, the clients' traffic is not always on peak rate, thus energy is wasted if all the PHYs are active.

SUMMARY

It is an object of the present disclosure to address the problem mentioned above.

According to a first aspect of the present disclosure, there is provided a method implemented by a first network device in a communication network. The first network device may be communicatively connected to a second network device by a FlexE group. The method may comprise measuring a traffic rate of one or more FlexE clients carried over the FlexE group, and determining whether one or more PHYs of the FlexE group is to be shut down or activated based on the measured traffic rate and a first shutdown threshold or a first activation threshold.

According to a second aspect of the present disclosure, there is provided a network device in a communication network. The network device communicatively coupled to another network device by a FlexE group in the communication network. The network device may comprise a processor and a memory communicatively coupled to the processor. The memory may be adapted to store instructions which, when executed by the processor, cause the network device to perform steps of the method according to the above first aspect.

According to the third aspect of the present disclosure, there is provided a non-transitory machine-readable medium having a computer program stored thereon. The computer program, when executed by a set of one or more processors of a network device, causes the network device to perform steps of the method according to the above first aspect.

BRIEF DESCRIPTION OF THE DRAWINGS

The present disclosure may be best understood by way of example with reference to the following description and accompanying drawings that are used to illustrate embodiments of the present disclosure. In the drawings.

DETAILED DESCRIPTION

Figures 1, 2:
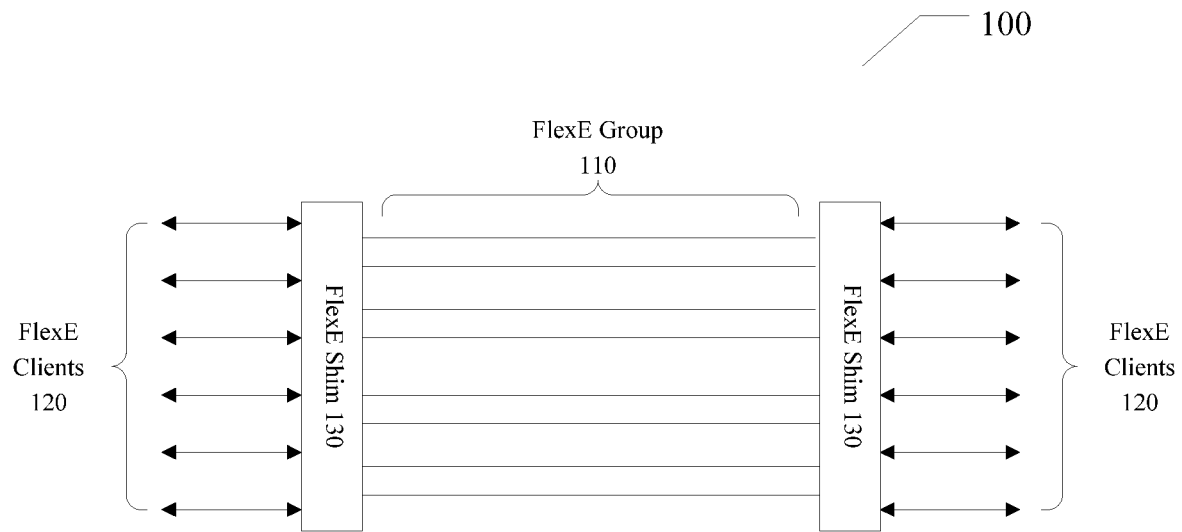
FIG. 1 is a diagram illustrating a logical structure of FlexE mechanism.
FIG. 2 schematically illustrates an exemplary flow diagram of a method for energy saving implemented by a first network device according to one or more embodiments of the present disclosure.

The following detailed description describes methods and apparatuses for energy saving in communication network. In the following detailed description, numerous specific details such as logic implementations, types and interrelationships of system components, etc. are set forth in order to provide a more thorough understanding of the present disclosure. It should be appreciated, however, by one skilled in the art that the present disclosure may be practiced without such specific details. In other instances, control structures, circuits and instruction sequences have not been shown in detail in order not to obscure the present disclosure. Those of ordinary skill in the art, with the included descriptions, will be able to implement appropriate functionality without undue experimentation.

As used herein, the terms "first", "second" and so forth refer to different elements. The singular forms "a", "an", and "the" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "according to" is to be read as "at least in part according to". The term "one embodiment" and "an embodiment" are to be read as "at least one embodiment". The term "another embodiment" is to be read as "at least one other embodiment".

Unless otherwise defined, all terms (including technical and scientific terms) used herein have the same meanings as commonly understood. It will be further understood that a term used herein should be interpreted as having a meaning consistent with its meaning in the context of this specification and the relevant art and will not be interpreted in an idealized or overly formal sense unless expressly so defined herein.

Bracketed text and blocks with dashed borders (e.g., large dashes, small dashes, dot-dash, and dots) may be used herein to illustrate optional operations that add additional features to embodiments of the present disclosure. However, such notation should not be taken to mean that these are the only options or optional operations, and/or that blocks with solid borders are not optional in certain embodiments of the present disclosure.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on, that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of or one or more physical network interfaces to establish network connections (to transmit and/or receive code and/or data using propagating signals) with other electronic devices. One or more parts of an embodiment of the present disclosure may be implemented using different combinations of software, firmware, and/or hardware.

A network device is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 1 is a diagram illustrating a logical structure of FlexE mechanism 100. The logical structure of FlexE mechanism 100 includes a FlexE group 110, one or more FlexE clients 120, and FlexE shims 130 at each end of the FlexE group. The FlexE group 110 refers to a group including 1 to n bonded Ethernet channels between the FlexE Shims 130. As used herein, a PHY transceiver or simply referred as "PHY" is a component that operates at the physical layer of the OSI network model. Each PHY can be identified by a number, for example in the range [1-254]. The values of 0 and 255 are reserved. A PHY number may correspond to the physical port ordering on equipment, such as a network device, and the FlexE shim at any end of the FlexE group can identify each PHY in the group using the PHY number. Each PHY of the FlexE group is able to deliver a logically serial stream of 64B/66B encoded blocks from the FlexE mux to the FlexE demux. The FlexE group 110 can include one or more bonded 100GBASE-R PHYs as well as including other rates, including new, higher rates once those standards are complete. The one or more FlexE clients 120 are each an Ethernet flow based on a MAC data rate that may or may not correspond to any Ethernet PHY rate. The FlexE client 120 MAC rates supported by the OIF-FLEXE 1.0 are 10, 40, and m×25 Gb/s. The FlexE shim 130 is the layer that maps or demaps the FlexE clients 120 carried over the FlexE group 110. A FlexE mux refers to the transmit direction which maps the FlexE clients 120 over the FlexE group 110. The FlexE demux refers to the receive direction which demaps the FlexE clients 120 from the FlexE group 110.

In practice, the clients' traffic in a communication network is not always uniformly distributed throughout a day. There may be some peak hours in which the traffic is significantly increased, and slack hours in which the traffic is much lower than average. Each 100G PHY will consume ~5 watts and 200G/400G PHY will consume more power. Thus, if all PHYs in a FlexE group are always active, even during the slack hours, the energy will be significantly wasted. In addition, the life time for PHYs will be reduced due to long working time.

The present embodiments herein proposes a method for energy saving in the communication network by dynamically shutting down or activating one or more PHYs in the FlexE group, in order to save the energy consumed by a communication network. Further, it can prolong life time for PHYs in a FlexE group thus saving the cost for PHYs. In a typical deployment of a FlexE group with four 100G PHYs, each PHY consumes ~5 watts. When 3 PHYs are shut down during slacks hours, for example, 0:00 AM-8:00 AM, the power consumption will save 25%, totally saving 87.6 kwh per year per pair of PHYs. At the meanwhile, the life time of PHYs will be prolonged 25%, thus saving ~1500 USD cost per QSFP28 100G-LR4 PHY.

FIG. 2 schematically illustrates an exemplary flow diagram 200 of a method for energy saving implemented by a first network device according to one or more embodiments of the present disclosure.

Referring to FIG. 2, in step 201, a traffic rate of one or more FlexE clients carried over the FlexE group may be measured by the first network device. In step 202, the first network device may determine whether one or more PHYs of the FlexE group is to be shut down or activated based on the measured traffic rate and a first shutdown threshold or a first activation threshold.

Figure 3:
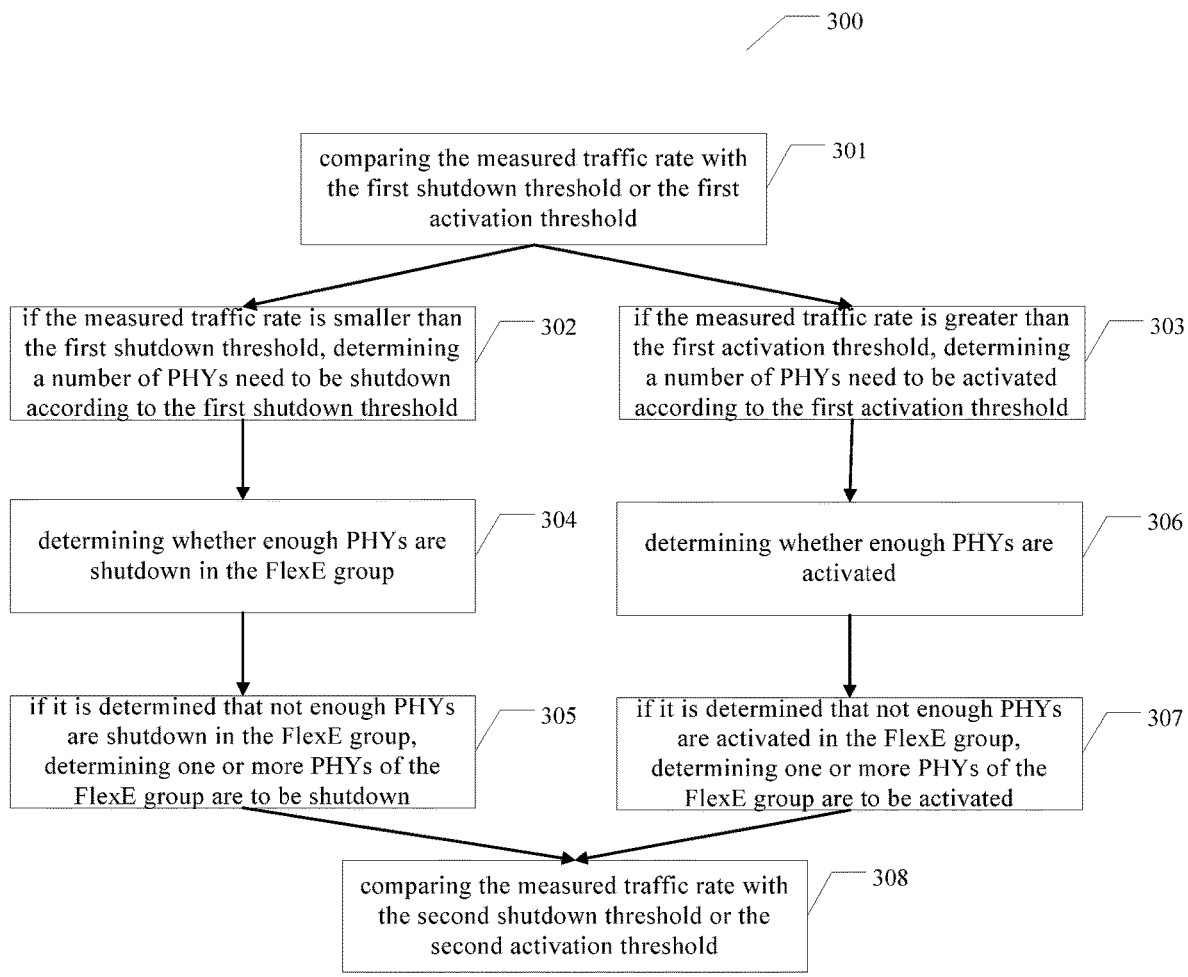
FIG. 3 schematically illustrates an exemplary flow diagram for determining whether one or more PHYs of the FlexE group according to one or more embodiments of the present disclosure.

FIG. 3 schematically illustrates an exemplary flow diagram 300 for determining whether one or more PHYs of the FlexE group are to be shut down or activated according to one or more embodiments of the present disclosure.

Referring to FIG. 3, in step 301, the measured traffic rate may be compared with the first shutdown threshold or the first activation threshold. If the measured traffic rate is smaller than the first shutdown threshold, the first network may determine a number of PHYs need to be shutdown according to the first shutdown threshold, as in step 302. If the measured traffic rate is greater than the first activation threshold, the first network may determine a number of PHYs need to be activated according to the first activation threshold, such as in step 303. As a further embodiment, there may be an offset between the first activation threshold and the first shutdown threshold. For example, the first activation threshold may be smaller than the first activation threshold. Such offset may be specified such that the PHYs will not be switched between active status and non-active status due to slight traffic fluctuation. Different activation or shutdown thresholds may correspond to different number of PHYs need to be activate or shut down. For example, in FIG. 4, there is an exemplary configuration of activation thresholds and shutdown thresholds for use in a FlexE group including four 100G PHYs.

Figure 4:
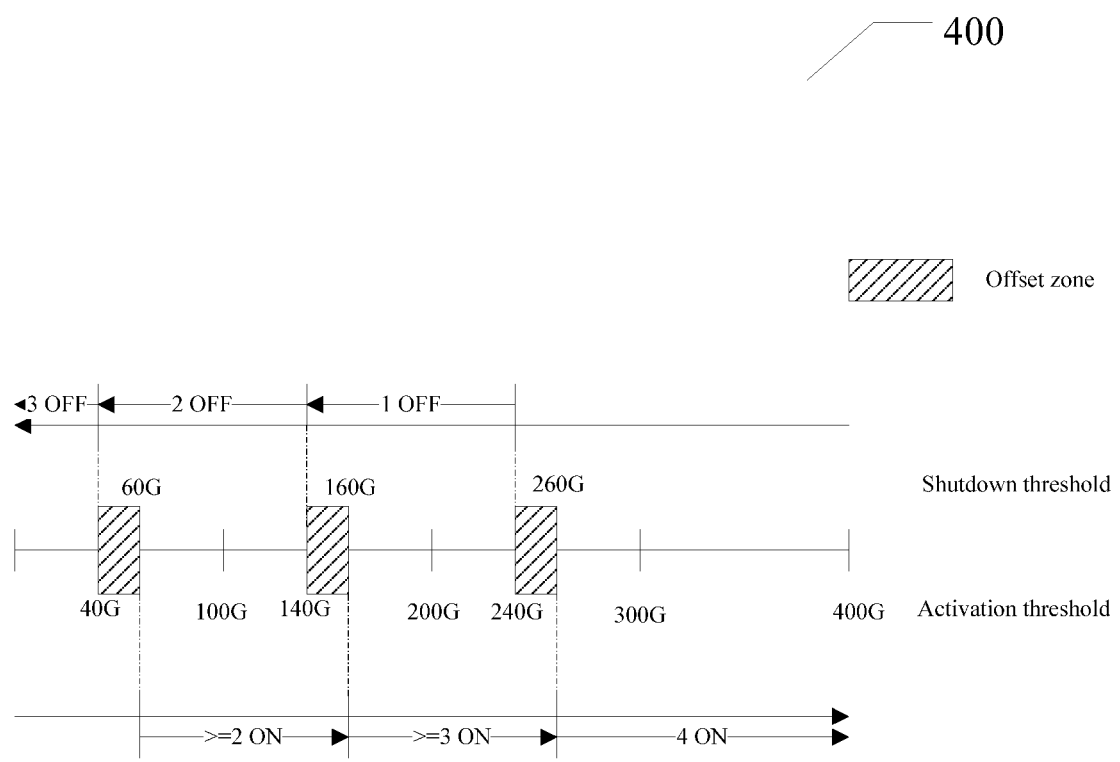
FIG. 4 illustrates an exemplary configuration of activation thresholds and shutdown thresholds for use in a FlexE group including four 100G PHYs.

As shown in FIG. 4, if the measured traffic rate is smaller than 240G, the first network device may know that three PHYs are enough for transmitting the clients' traffic, thus the first network device may determine one PHY need to be shutdown. If the measured traffic rate is greater than 260G, the first network device may know that the capacity of PHYs is about to run out or the capacity of PHYs may be not enough to transmit the clients' traffic, in the event that three or less PHYs are active in the FlexE group. Thus, the first network device may determine all four PHYs need to be activated. In a similar manner, if the measured traffic rate is smaller than 140G, the first network device may determine two PHYs need to be shutdown. If the measured traffic rate is greater than 160G, the first network device may determine at least three PHYs need to be activated. Similarly, if the measured traffic rate is smaller than 40G, the first network device may determine three PHYs need to be shutdown. If the measured traffic rate is greater than 60G, the first network device may determine at least two PHYs need to be activated. As illustrated in FIG. 4, there may be an 20G offset between the activation threshold and the shutdown threshold to prevent frequently shutting down and activating of PHYs.

FIG. 4 only serves as a non-limiting example of the FlexE mechanism and the method described in the present disclosure can be applied to different FlexE mechanism with different configuration. For example, the FlexE group may include different number of PHYs. In addition, the 100G PHY used herein is by way of illustration, but not by way of limitation. The FlexE group may include several 200G PHYs, 400G PHYs, or may include several PHY with other suitable bandwidth.

Turning back to FIG. 3, if the measured traffic rate is smaller than the first shutdown threshold, the first network device may further determine whether enough PHYs are shutdown in the FlexE group, as in step 304. If it is determined that not enough PHYs are shutdown in the FlexE group, the first network device may determine one or more PHYs of the FlexE group are to be shutdown, as in step 305. If the measured traffic rate is greater than the first activation threshold, the first network device may further determine whether enough PHYs are activated, as in step 306. If it is determined that not enough PHYs are activated in the FlexE group, the first network device may determine one or more PHYs of the FlexE group are to be activated, as in step 307. In step 308, in the event that two or more sets of activation and shutdown thresholds may be used to determine whether one or more PHYs of the FlexE group are to be shut down or activated, the first network device may determine whether one or more PHYs of the FlexE group are to be shut down or activated according to the measured traffic rate, a second shutdown threshold and a second activation threshold in a similar manner as described above, and so on.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps may be executed, at least partially, in parallel. A given step may not have finished completely before a next step is started. Moreover, fewer than all the illustrated steps may be required to implement an example methodology. Steps may be combined or separated into multiple sub-steps. Furthermore, additional or alternative methodologies can employ additional, not illustrated steps.

Figure 5:
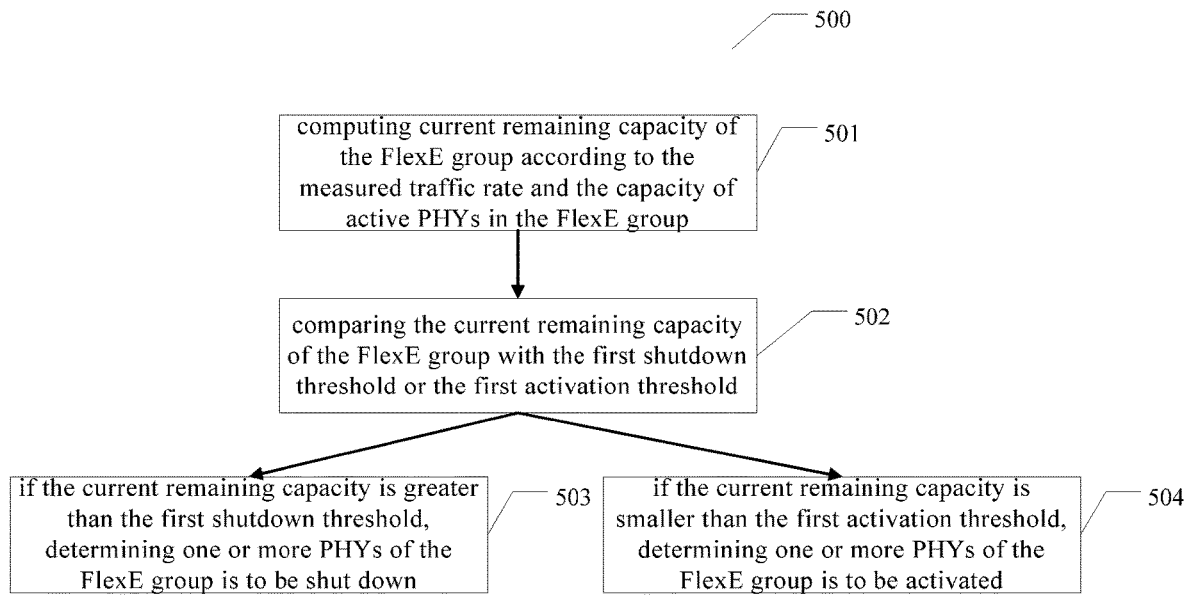
FIG. 5 schematically illustrates another exemplary flow diagram for determining whether one or more PHYs of the FlexE group according to one or more embodiments of the present disclosure.

FIG. 5 schematically illustrates another exemplary flow diagram 500 for determining whether one or more PHYs of the FlexE group according to one or more embodiments of the present disclosure.

Referring to FIG. 5, in step 501, current remaining capacity of the FlexE group may be computed according to the measured traffic rate and the capacity of active PHYs in the FlexE group. For example, the current remaining capacity may be computed by subtracting the measured traffic rate from the capacity of active PHYs in the FlexE group. When the measured traffic rate is greater than the capacity of active PHYs in the FlexE group, the current remaining capacity is positive. When the measured traffic rate is smaller than the capacity of active PHYs in the the FlexE group, the current remaining capacity is negative. Then, in step 502, the current remaining capacity of the FlexE group may be compared with the first shutdown threshold or the first activation threshold. If the current remaining capacity is greater than the first shutdown threshold, the first network device may determine that one or more PHYs of the FlexE group is to be shut down, as in step 503. If the current remaining capacity is smaller than the first activation threshold, the first network device may determine that one or more PHYs of the FlexE group is to be activated, as in step 504. As an embodiment, the first network device may determine the number of PHYs to be shut down or activated based on the current remaining capacity and the first shutdown threshold or the first activation threshold.

Figure 6:
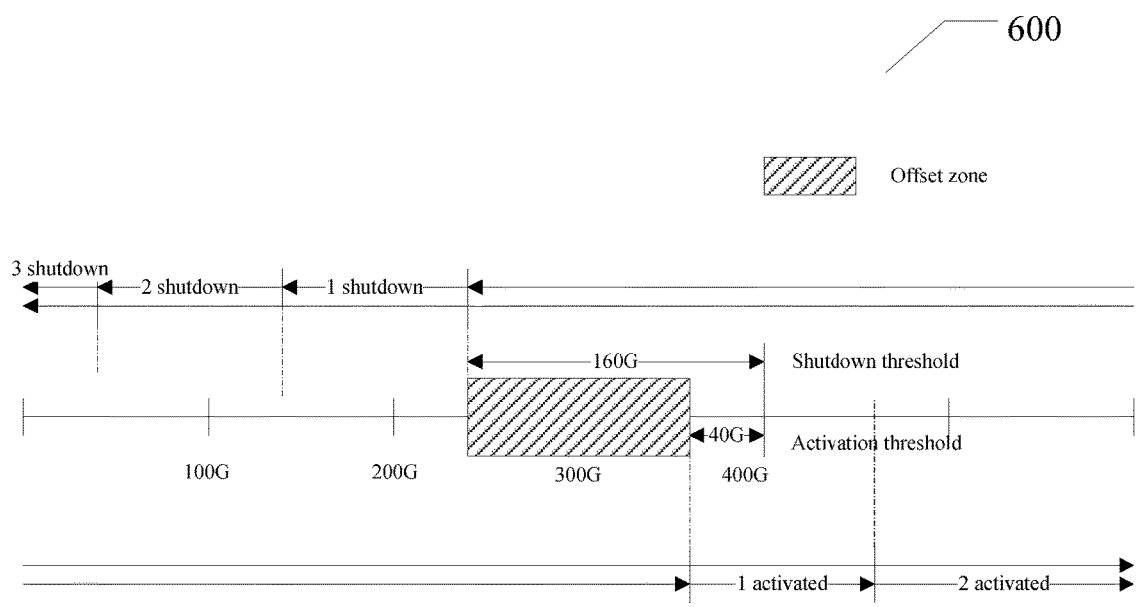
FIG. 6 illustrates another exemplary configuration of activation thresholds and shutdown thresholds for use in a FlexE group including six 100G PHYs.

For example, in FIG. 6, there is an exemplary configuration 600 of activation thresholds and shutdown thresholds for use in a FlexE group including six 100G PHYs, four PHYs thereof are active. As shown in FIG. 6, the shutdown threshold is set to 160G, and the activation threshold is set to 40G. If the current remaining capacity is greater than 160G, the first network device may determine that one or more PHYs in the FlexE group are to be shut down, and the number of PHYs to be shutdown may be computed by rounding up the result of (current remaining capacity—shutdown threshold)/100G. If the current remaining capacity is smaller than 40G, the first network device may determine that one or more PHYs in the FlexE group are to be activated, and the number of PHYs to be activated may be computed by rounding up the result of (activation threshold—current remaining capacity)/100G. In addition, the number of active PHYs after activating the one or more PHYs may not exceed the total number of the PHYs in the FlexE group, e.g. six, in this example, and the number of active PHYs after shutting down the one or more PHYs may not less than one. As an example, there may be an offset between the shutdown threshold and the activation threshold. Further, the offset may be greater than the capacity of one PHY, e.g. 100G, in this example.

FIG. 6 only serves as a non-limiting example of the FlexE mechanism and the method described in the present disclosure can be applied to different FlexE mechanism with different configuration. For example, the FlexE group may include different number of PHYs. In addition, the 100G PHY used herein is by way of illustration, but not by way of limitation. The FlexE group may include several 200G PHYs, 400G PHYs, or may include several PHY with other suitable bandwidth.

It is desirable for those skilled in the art to appreciate and conceive modification, or change to the method described in the present disclosure in different system configurations or application scenario, with the teaching and suggestion in this disclosure.

Figure 7:
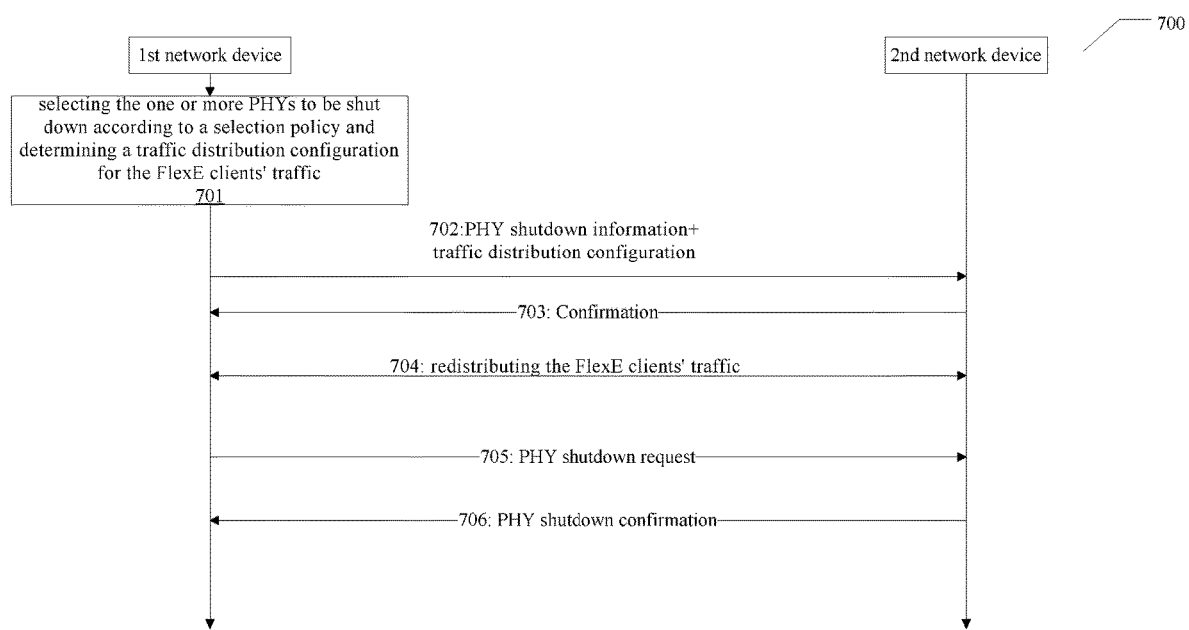
FIG. 7 illustrates a flow chart of an exemplary process for shutting down one or more PHYs in the FlexE group according to one or more embodiments of the present disclosure.

FIG. 7 illustrates a flow chart of an exemplary process 700 for shutting down one or more PHYs in the FlexE group according to one or more embodiments of the present disclosure. The first network device may determine whether one or more PHYs in the FlexE group is to be shutdown according to the method illustrated in FIG. 2, FIG. 3 or FIG. 5.

Referring to FIG. 7, as in step 701, if it is determined that one or more PHYs of the FlexE group is to be shut down, the first network device may select the one or more PHYs to be shut down according to a selection policy and determine a traffic distribution configuration for the FlexE clients' traffic. The traffic distribution configuration is used to allocate bandwidth to each client. The number of available FlexE slots is changed due to the PHYs to be shut down or activated. In the case that all PHYs in the FlexE group are activated, the FlexE client may be allocated the initially configured bandwidth. When some PHYs are shut down in the FlexE group, the bandwidth allocated to the clients may be reduced to accommodate the reduced bandwidth. When the shutdown PHYs are activated again in the FlexE group, the bandwidth allocated to the clients may be increased again. As an embodiment, the traffic distribution configuration may indicate the bandwidth assigned for each FlexE client by the first network device. As an example, the traffic distribution configuration may be determined by reducing or increasing an average shutdown or activation bandwidth for each FlexE client. As another example, the traffic distribution configuration may be determined based on a ratio of each FlexE client's traffic or any other suitable policies. By way of example, the selection policy may include round robin, least client impact, configured order or any other suitable selection policies. As shown in step 702, the first network device may send PHY shutdown information and the traffic distribution configuration for the FlexE clients' traffic to the second network device. The PHY shutdown information may indicate the selected one or more PHYs to be shut down. By way of example, the PHY shutdown information may include a list of PHY number for PHYs which are shut down. As another example, the PHY shutdown information may include an updated indication of PHY status for each PHY in the FlexE group. The person skilled in art may appreciate other forms for PHY shutdown information without departing the spirit and teaching of this disclosure. Then, as in step 703, the first network device may receive a confirmation from the second network device to indicate that the PHYs to be shut down and the traffic distribution configuration for the second network device is aligned with the first network device. It is desirable for those skilled in the art to appreciate and conceive modification, or change to the present disclosure in different system configurations or application scenario, with the teaching and suggestion in this disclosure. Then, the FlexE clients' traffic may be redistributed according to the traffic distribution configuration as in step 704. The steps for redistribution will be described in more details in the following.

Then, the first network device may begin to shut down the selected one or more PHYs in the FlexE group, after the FlexE clients' traffic carried over the selected one or more PHYs are redistributed to other PHYs in the FlexE group. For example, in step 705, the first network device may send a PHY shutdown request to the second network device. The PHY shutdown request may be used to instruct the second network device to shutdown one or more PHYs according to the received PHY shutdown information. The first network device may shut down the selected one or more PHYs, for example, after sending the PHY shutdown request. Then, to the second network device may shut down the selected one or more PHYs after receiving the PHY shutdown request. In step 706, the first network device may receive a PHY shutdown confirmation from the second network device to indicate that the selected one or more PHYs are shut down according to the received PHY shutdown information.

Figure 8:
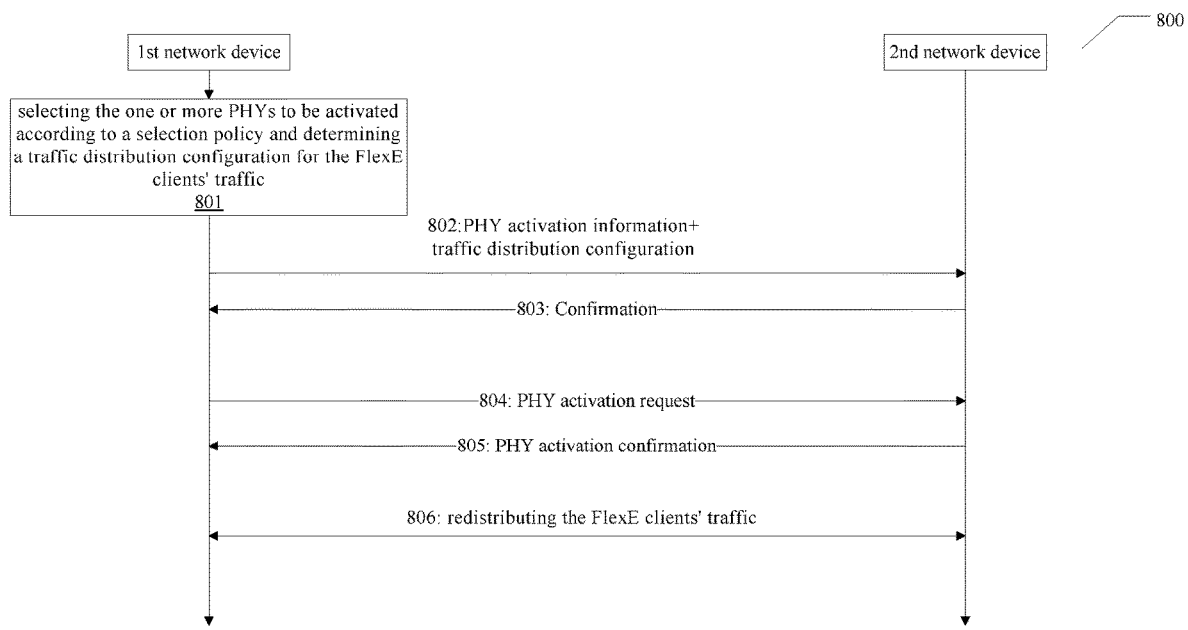
FIG. 8 illustrates a flow chart of an exemplary process for activating one or more PHYs in the FlexE group in accordance with one or more embodiments of the present disclosure.

FIG. 8 illustrates a flow chart of an exemplary process 800 for activating one or more PHYs in the FlexE group according to one or more embodiments of the present disclosure. The first network device may determine whether one or more PHYs in the FlexE group is to be activated according to the method illustrated in FIG. 2, FIG. 3 or FIG. 5.

Referring to FIG. 8, as in step 801, if it is determined that one or more PHYs of the FlexE group is to be activated, the first network device may select the one or more PHYs to be activated according to a selection policy and determine a traffic distribution configuration for the FlexE clients' traffic. As a specific embodiment, the traffic distribution configuration may include a map from the FlexE clients to the active PHYs in the FlexE group. As an example, the selection policy may include round robin, least client impact, configured order or any other suitable selection policies. As another example, the traffic distribution configuration is determined based on a ratio of each FlexE client's traffic or any other suitable policies. As shown in step 802, the first network device may send PHY activation information and the traffic distribution configuration for the FlexE clients' traffic to the second network device. By way of example, the PHY activation information may indicate the selected one or more PHYs to be activated. By way of example, the PHY activation information may include a list of PHY number for PHYs which are activated. As another example, the PHY activation information may include an updated indication of PHY status for each PHY in the FlexE group. The person skilled in art may appreciate other forms for PHY activation information without departing the spirit and teaching of this disclosure. Then, as in step 803, the first network device may receive a confirmation from the second network device to indicate that the PHYs to be activated and the traffic distribution configuration for the second network device is aligned with the first network device.

Then, the first network device may begin to activate the selected one or more PHYs in the FlexE group. For example, in step 804, the first network device may send a PHY activation request to the second network device. The PHY activation request may be used to instruct the second network device to activate one or more PHYs according to the received PHY activation information. The first network device may activate the selected one or more PHYs, for example, after sending the PHY activation request. Then, the second network device may activate the selected one or more PHYs after receiving the PHY activation request. In step 805, the first network device may receive a PHY activation confirmation from the second network device to indicate that the selected one or more PHYs are activated according to the received PHY activation information. Then, the FlexE clients' traffic may be redistributed according to the traffic distribution configuration, after the first network device and the second device both activate the selected one or more PHYs, as in step 806. The steps for redistribution will be described in more details in the following.

FIG. 7 and FIG. 8 illustrate a master-slave mode for shutting down and activating one or more PHYs in the FlexE group according to one or more embodiments of the present disclosure, in which the first network device functions as a master and the second network device functions as a slave. The skilled person in the art may appreciate other communication modes, such as negotiation mode, without departing the spirit and teaching of this disclosure. For example, the first network device and the second network device may negotiate with each other to determine which one should determine the PHYs to be shutdown or activated and initiate the request, and then, the other receive may respond with a confirmation. It may be desirable to exploit different forms of communication modes, which depends on the specific system implementations.

For simplicity of explanation, the methodology described in conjunction with FIGS. 7 and 8 is depicted and described as a series of acts. It is to be understood and appreciated that aspects of the subject matter described herein are not limited by the acts illustrated and/or by the order of acts. In one embodiment, the acts occur in an order as described above. In other embodiments, however, two or more of the acts may occur in parallel or in another order. In other embodiments, one or more of the actions may occur with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Figure 9:
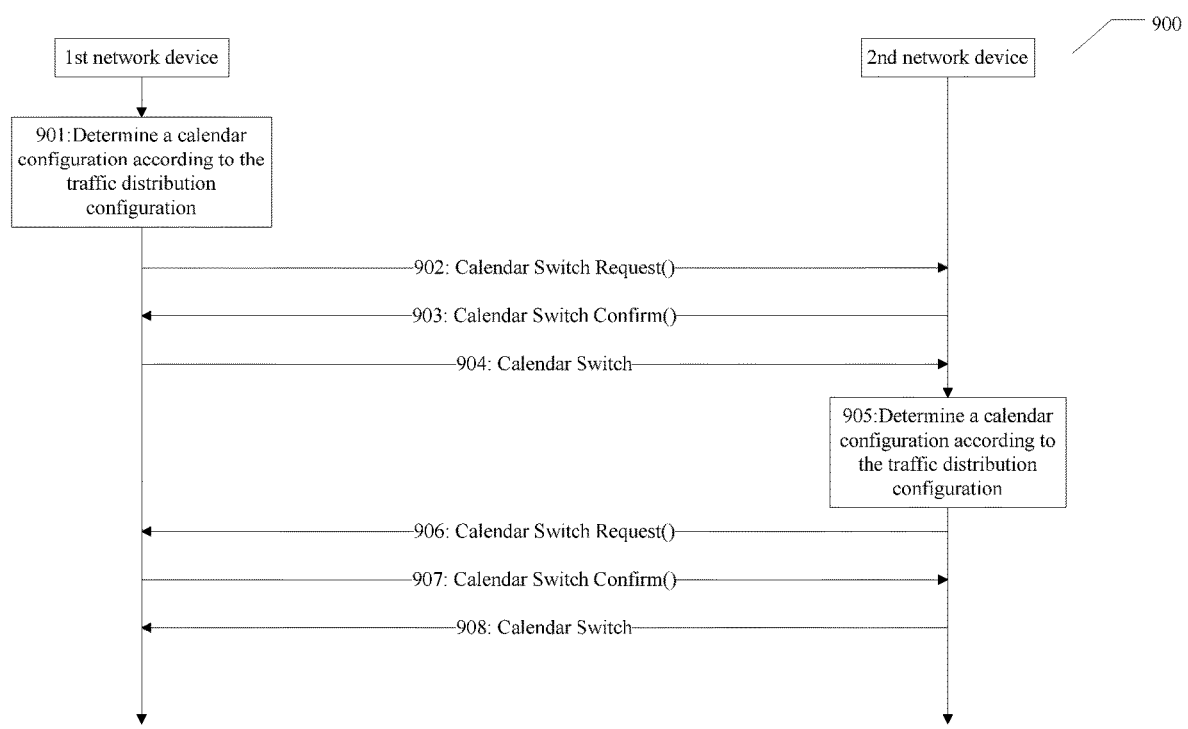
FIG. 9 illustrates an exemplary process for redistributing the FlexE clients' traffic according to the traffic distribution configuration according to one or more embodiments of the present disclosure.

FIG. 9 illustrates an exemplary process 900 for redistributing the FlexE clients' traffic according to the traffic distribution configuration according to one or more embodiments of the present disclosure. The process provided in FIG. 9 is merely an example, and the skilled person in the art may conceive other processes in different implementation.

Referring to FIG. 9, in step 901, the first network device may determine an calendar configuration according to the traffic distribution configuration. The FlexE mechanism operates using a calendar which assigns 66B block positions on sub-calendars on each PHY of the FlexE group to each of the FlexE clients. For example, the calendar has a granularity of 5G, and has a length of 20 slots per 100G of FlexE group capacity. The calendar configuration is used for mapping the FlexE clients into the FlexE group and demapping the FlexE clients from the FlexE group. The calendar configuration may be exchanged between the first network device and the second network device periodically. As shown in step 902, the first network device may send a calendar switch request message to the second device to indicate that the calendar configuration for the first network device is switched to another calendar configuration. Then, the second device may save the calendar configuration sent by the first network device and send a calendar switch confirmation message to the first network device in step 903. Then, in step 904, the first network device may send a switch message to the second network device, the switch message may indicate that the first network device has switched the calendar configuration, and the subsequent clients' traffic may be transmitted according to the updated calendar configuration. By this process, the clients' traffic transmitted from the first network device to the second network device is redistributed. Similarly, the clients' traffic transmitted from the second device to the first network device may be redistributed in a similar manner as shown in steps 905-908. In one embodiment, the redistribution by the first network device and the second network device may be interchangeable. In another embodiment, the redistribution by the first network device and the second network device may be in parallel.

For simplicity of explanation, the methodology described in conjunction with FIG. 9 is depicted and described as a series of acts. It is to be understood and appreciated that aspects of the subject matter described herein are not limited by the acts illustrated and/or by the order of acts. In one embodiment, the acts occur in an order as described above. In other embodiments, however, two or more of the acts may occur in parallel or in another order. In other embodiments, one or more of the actions may occur with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Figure 10:
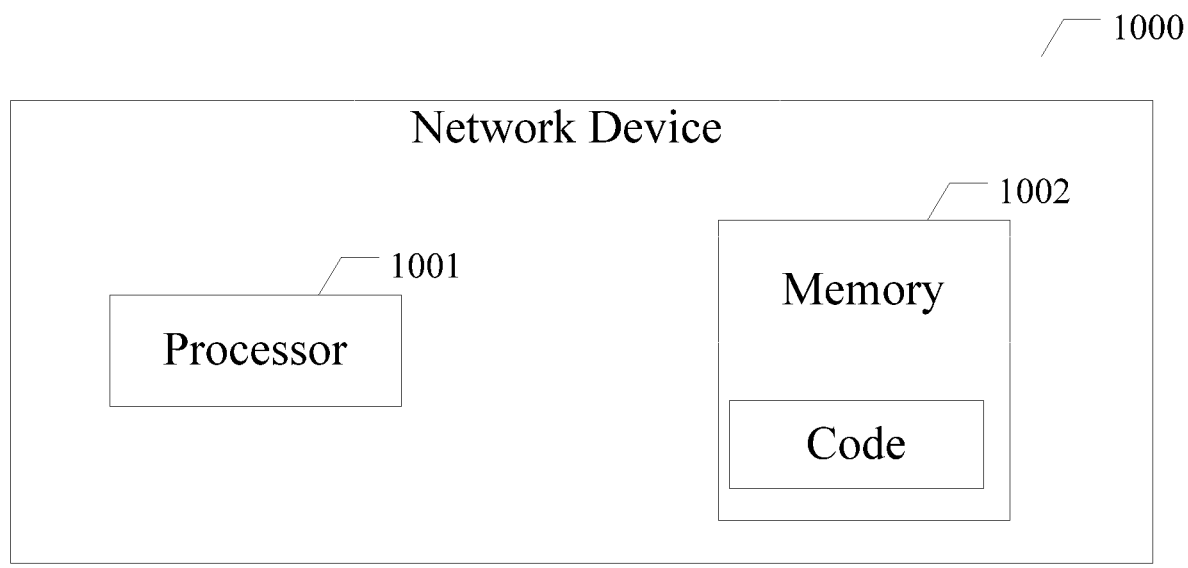
FIG. 10 is a block diagram illustrating a network device according to some embodiments of the present disclosure.

FIG. 10 is a block diagram illustrating a network device 1000 according to some embodiments of the present disclosure. It should be appreciated that the network device 1000 may be implemented using components other than those illustrated in FIG. 10.

With reference to FIG. 10, the network device 1000 may comprise at least a processor 1001, a memory 1002, an interface and a communication medium. The processor 1001, the memory 1002 and the interface are communicatively coupled to each other via the communication medium.

The processor 1001 includes one or more processing units. A processing unit may be a physical device or article of manufacture comprising one or more integrated circuits that read data and instructions from computer readable media, such as the memory 1002, and selectively execute the instructions. In various embodiments, the processor 1001 is implemented in various ways. As an example, the processor 1002 may be implemented as one or more processing cores. As another example, the processor 1001 may comprise one or more separate microprocessors. In yet another example, the processor 1001 may comprise an application-specific integrated circuit (ASIC) that provides specific functionality. In yet another example, the processor 1001 provides specific functionality by using an ASIC and by executing computer-executable instructions.

The memory 1002 includes one or more computer-usable or computer-readable storage medium capable of storing data and/or computer-executable instructions. It should be appreciated that the storage medium is preferably a non-transitory storage medium.

The communication medium facilitates communication among the processor 1001, the memory 1002 and the interface. The communication medium may be implemented in various ways. For example, the communication medium may comprise a Peripheral Component Interconnect (PCI) bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing System Interface (SCSI) interface, or another type of communications medium. The interface could be coupled to the processor. Information and data as described above in connection with the methods may be sent via the interface.

In the example of FIG. 10, the instructions stored in the memory 1002 may include those that, when executed by the processor 1001, cause the network device 1000 to implement the methods described with respect to FIGS. 2-9.

Some portions of the foregoing detailed description have been presented in terms of algorithms and symbolic representations of transactions on data bits within a computer memory. These algorithmic descriptions and representations are ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be appreciated, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to actions and processes of a computer system, or a similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present disclosure are not described with reference to any particular programming language. It should be appreciated that a variety of programming languages may be used to implement the teachings of embodiments of the present disclosure as described herein.

An embodiment of the present disclosure may be an article of manufacture in which a non-transitory machine-readable medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In the foregoing detailed description, embodiments of the present disclosure have been described with reference to specific exemplary embodiments thereof. It will be evident that various modifications may be made thereto without departing from the spirit and scope of the present disclosure as set forth in the following claims. The specification and drawings are, accordingly, to be regarded in an illustrative sense rather than a restrictive sense.

Throughout the description, some embodiments of the present disclosure have been presented through flow diagrams. It should be appreciated that the order of transactions and transactions described in these flow diagrams are only intended for illustrative purposes and not intended as a limitation of the present disclosure. One having ordinary skill in the art would recognize that variations can be made to the flow diagrams without departing from the spirit and scope of the present disclosure as set forth in the following claims.

The invention claimed is:

1. A method implemented by a first network device in a communication network, wherein the first network device is communicatively connected to a second network device by a Flexible Ethernet (FlexE) group, the method comprising:
using a processor communicatively coupled to a memory to execute instructions stored by the memory, wherein using the processor to execute the instructions causes the first network device to perform steps comprising:
measuring a traffic rate of one or more FlexE clients carried over the FlexE group;
determining whether one or more Flexible Physicals (PHYs) of the FlexE group is to be shut down or activated based on the measured traffic rate and a first shutdown threshold or a first activation threshold; and
if it is determined that one or more PHYs of the FlexE group is to be shut down or activated, selecting the one or more PHYs to be shut down or activated according to a selection policy.

2. The method of claim 1, wherein determining whether one or more PHYs of the FlexE group is to be shut down or activated based on the measured traffic rate, a first shutdown threshold or a first activation threshold, comprises:
comparing the measured traffic rate with the first shutdown threshold or the first activation threshold;
if the measured traffic rate is smaller than the first shutdown threshold, determining a number of PHYs to be shutdown according to the first shutdown threshold; or
if the measured traffic rate is greater than the first activation threshold, determining a number of PHYs to be activated according to the first activation threshold.

3. The method of claim 2, wherein using the processor to execute the instructions stored by the memory further causes the first network device to perform steps comprising:
determining whether enough PHYs are shutdown in the FlexE group; and if it is determined that not enough PHYs are shutdown in the FlexE group, determining one or more PHYs of the FlexE group to be shutdown.

4. The method of claim 2, wherein using the processor to execute the instructions stored by the memory further causes the first network device to perform steps comprising:
determining whether enough PHYs are activated; and
if it is determined that not enough PHYs are activated in the FlexE group, determining one or more PHYs of the FlexE group to be activated.

5. The method of claim 4, wherein using the processor to execute the instructions stored by the memory further causes the first network device to perform:
determining whether one or more PHYs of the FlexE group is to be shut down or activated based on the measured traffic rate, a second shutdown threshold, or a second activation threshold.

6. The method of claim 2, wherein there is an offset between the first shutdown threshold and the first activation threshold.

7. The method of claim 1, wherein determining whether one or more PHYs of the FlexE group is to be shut down or activated based on the measured traffic rate, a first shutdown threshold or a first activation threshold, comprises:
computing current remaining capacity of the FlexE group according to the measured traffic rate and the capacity of active PHYs in the FlexE group;
comparing the current remaining capacity of the FlexE group with the first shutdown threshold or the first activation threshold;
if the current remaining capacity is greater than the first shutdown threshold, determining one or more PHYs of the FlexE group to be shut down; or
if the current remaining capacity is smaller than the first activation threshold, determining one or more PHYs of the FlexE group to be activated.

8. The method of claim 7, wherein there is an offset between the first shutdown threshold and the first activation threshold, wherein the offset is greater than the capacity of one PHY.

9. The method of claim 1, wherein using the processor to execute the instructions stored by the memory further causes the first network device to perform:
if it is determined that one or more PHYs of the FlexE group is to be shut down or activated, determining a traffic distribution configuration for the FlexE clients' traffic.

10. The method of claim 9, wherein using the processor to execute the instructions stored by the memory further causes the first network device to perform steps comprising:
sending PHY shutdown information indicating the selected one or more PHYs to be shut down or PHY activation information indicating the selected one or more PHYs to be activated and the traffic distribution configuration for the FlexE clients' traffic to the second network device; and
receiving a confirmation from the second network device to indicate that the PHYs to be shut down or activated and the traffic distribution configuration for the second network device is aligned with the first network device.

11. The method of claim 10, using the processor to execute the instructions stored by the memory further causes the first network device to perform steps comprising:
sending a PHY shutdown request or a PHY activation request to the second network device, the PHY shutdown requests to instruct the second network device to shutdown one or more PHYs according to the received PHY shutdown information, and the PHY activation request is to instruct the second network device to activate the selected one or more PHYs according to the received PHY activation information; and
receiving a PHY shutdown confirmation or a PHY activation confirmation from the second network device to indicate that the selected one or more PHYs are shut down or activated by the second network according to the received PHY shutdown information or the received PHY activation information.

12. The method of claim 9, wherein the instructions, when executed by the processor, further cause the network device to perform steps comprising:
shutting down or activating the selected one or more PHYs; and
redistributing the FlexE clients' traffic according to the traffic distribution configuration before shutting down the selected one or more PHYs or after activating the selected one or more PHYs.

13. A network device in a communication network, the network device communicatively coupled to another network device by a Flexible Ethernet (FlexE) group, and comprising:
a processor; and
a memory communicatively coupled to the processor and adapted to store instructions which, when executed by the processor, cause the network device to perform steps comprising:
measuring a traffic rate of one or more FlexE clients carried over the FlexE group;
determining whether one or more Flexible Physicals (PHYs) of the FlexE group is to be shut down or activated based on the measured traffic rate and a first shutdown threshold or a first activation threshold; and
if it is determined that one or more PHYs of the FlexE group is to be shut down or activated, selecting the one or more PHYs to be shut down or activated according to a selection policy.

14. The network device of claim 13, wherein determining whether one or more PHYs of the FlexE group is to be shut down or activated based on the measured traffic rate, a first shutdown threshold or a first activation threshold, comprises:
comparing the measured traffic rate with the first shutdown threshold or the first activation threshold;
if the measured traffic rate is smaller than the first shutdown threshold, determining a number of PHYs to be shutdown according to the first shutdown threshold; or
if the measured traffic rate is greater than the first activation threshold, determining a number of PHYs to be activated according to the first activation threshold.

15. The network device of claim 14, wherein the instructions, when executed by the processor, further cause the network device to perform steps comprising:
determining whether enough PHYs are shutdown in the FlexE group; and
if it is determined that not enough PHYs are shutdown in the FlexE group, determining one or more PHYs of the FlexE group to be shutdown.

16. The network device of claim 14, wherein the instructions, when executed by the processor, further cause the network device to perform steps comprising:
determining whether enough PHYs are activated; and
if it is determined that not enough PHYs are activated in the FlexE group, determining one or more PHYs of the FlexE group to be activated.

17. The network device of claim 16, wherein the instructions, when executed by the processor, further cause the network device to perform:
  determining whether one or more PHYs of the FlexE group is to be shut down or activated based on the measured traffic rate, a second shutdown threshold, or a second activation threshold.

18. The network device of claim 14, wherein there is an offset between the first shutdown threshold and the first activation threshold.

19. The network device of claim 13, wherein determining whether one or more PHYs of the FlexE group is to be shut down or activated based on the measured traffic rate, a first shutdown threshold or a first activation threshold, comprises:
  computing current remaining capacity of the FlexE group according to the measured traffic rate and the capacity of active PHYs in the FlexE group;
  comparing the current remaining capacity of the FlexE group with the first shutdown threshold or the first activation threshold;
  if the current remaining capacity is greater than the first shutdown threshold, determining one or more PHYs of the FlexE group to be shut down; or
  if the current remaining capacity is smaller than the first activation threshold, determining one or more PHYs of the FlexE group to be activated.

20. The network device of claim 19, wherein there is an offset between the first shutdown threshold and the first activation threshold, wherein the offset is greater than the capacity of one PHY.

21. The network device of claim 13, wherein the instructions, when executed by the processor, further cause the network device to perform:
  if it is determined that one or more PHYs of the FlexE group is to be shut down or activated, determining a traffic distribution configuration for the FlexE clients' traffic.

22. The network device of claim 21, wherein the instructions, when executed by the processor, further cause the network device to perform steps comprising:
  sending PHY shutdown information indicating the selected one or more PHYs to be shut down or PHY activation information indicating the selected one or more PHYs to be activated and the traffic distribution configuration for the FlexE clients' traffic to the second network device; and
  receiving a confirmation from the second network device to indicate that the PHYs to be shut down or activated and the traffic distribution configuration for the second network device is aligned with the first network device.

23. The network device of claim 22, wherein the instructions, when executed by the processor, further cause the network device to perform steps comprising:
  sending a PHY shutdown request or a PHY activation request to the second network device, the PHY shutdown request is to instruct the second network device to shutdown one or more PHYs according to the received PHY shutdown information, and the PHY activation request is to instruct the second network device to activate the selected one or more PHYs according to the received PHY activation information; and
  receiving a PHY shutdown confirmation or a PHY activation confirmation from the second network device to indicate that the selected one or more PHYs are shut down or activated by the second network according to the received PHY shutdown information or the received PHY activation information.

24. The network device of claim 21, wherein the instructions, when executed by the processor, further cause the network device to perform steps comprising:
  shutting down or activating the selected one or more PHYs; and
  redistributing the FlexE clients' traffic according to the traffic distribution configuration before shutting down the selected one or more PHYs or after activating the selected one or more PHYs.

\* \* \* \* \*